United States Patent Office 3,020,123
Patented Feb. 6, 1962

3,020,123
PREPARATION OF METAL THIOCYANATES AND WERNER COMPLEXES THEREOF
William D. Schaeffer, Pomona, and Homer E. Rea, Fullerton, Calif., assignors to Union Oil Company of California, Los Angeles, Calif., a corporation of California
No Drawing. Filed June 16, 1959, Ser. No. 820,605
12 Claims. (Cl. 23—75)

This invention relates to new methods for the preparation of certain divalent metal thiocyanates, and certain Werner complexes thereof. These Werner complexes are made up of a thiocyanate of manganese, nickel, iron or cobalt, coordinated with from 2 to 6 moles of a heterocyclic nitrogen base. Werner complexes of this type have recently been found highly useful as selective clathrating agents for separating a wide variety of difficultly separable mixtures of aromatic compounds, as disclosed in U.S. Patent No. 2,798,891. The invention provides a simple and convenient method for preparing the pure anhydrous thiocyanate salts of manganese, iron, nickel or cobalt, particularly adapted for conversion to the Werner complexes.

In broad aspect, the process of this invention involves firstly effecting a metathetical reaction in a lower monohydric alcohol solvent between an alkali metal- or ammonium thiocyanate, and a sulfate or chloride of manganese, iron, nickel or cobalt, as illustrated by the equation:

(1) $NiSO_4 + 2NH_4SCN \rightleftharpoons Ni(SCN)_2 + (NH_4)_2SO_4$

It is found that, in anhydrous lower monohydric alcohol solvents, the relative solubilities are such that Equation 1 is driven substantially to completion to the right, with ammonium sulfate precipitating out and nickel thiocyanate remaining in solution. Essentially the same solubility relationships are observed when nickel is replaced with manganese, iron or cobalt; the sulfate salts by chloride salts; and the ammonium thiocyanate by an alkali metal thiocyanate. Upon filtering off the ammonium sulfate, or alkali metal sulfate or chloride as the case may be, an alcoholic solution of the divalent metal thiocyanate remains, which may be recovered in pure anhydrous form if desired by distilling off the alcohol.

Where it is desired to convert the metal thiocyanate to a Werner complex, the alcoholic solution of divalent metal thiocyanate is mixed directly with the heterocyclic nitrogen base, whereupon the desired Werner complex is formed, and usually is partly precipitated. This reaction is illustrated as follows, using 4-methyl pyridine as the nitrogen base:

(2) 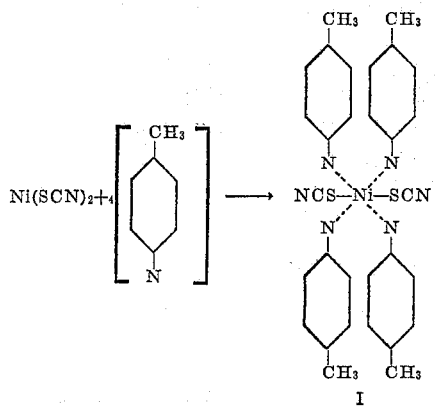

I

While Equation 2 illustrates the preparation of a tetra-coordinated complex, other complexes containing 2 or 6 moles of the nitrogen base may be prepared by simply using the appropriate stoichiometric quantities of nitrogen base. For purposes of this invention, the tetra-coordinated complexes are the ones principally desired.

The metal thiocyanate Werner complexes of heterocyclic nitrogen bases are difficult to prepare in a form which is both anhydrous and free of contaminating ions. In the past it has been our general practice to prepare these complexes by simply adding the nitrogen base to a water solution of a soluble nickel salt and a soluble thiocyanate salt. The resulting insoluble Werner complex is then recovered by filtration, washed to remove extraneous ions, and then dried at low temperatures in a stream of air. This procedure is disadvantageous from several standpoints. In the first place, it is very difficult to remove all of the extraneous salts by washing. Secondly, several days are ordinarily required to obtain adequate drying. Furthermore, it is extremely difficult to remove all traces of water at temperatures which do not effect some volatilization of nitrogen base from the Werner complex. The presence of water and/or extraneous salts is highly undesirable in the clathration process, in that the clathrating capacity of the Werner complex is considerably impaired even by traces of such materials.

It is obvious that the foregoing difficulties would be avoided by simply reacting pure, anhydrous nickel thiocyanate with the anhydrous nitrogen base. However, we have previously eschewed this method because no convenient and inexpensive methods for preparing the pure divalent metal thiocyanates were known. See for example Sidgwick, Chemical Elements and Their Compounds, 1950, volume II, page 1434, which suggests using expensive and inconvenient reagents and techniques for preparing nickel thiocyanate. According to the present invention, these difficulties are avoided.

In U.S. Patent No. 2,849,513, to W. D. Schaeffer, a specific adaptation of the clathration process is described which involves the use of lower aliphatic monohydric alcohols as solvent media for the clathration process. Most of the alcohol solvents employed herein are also useful as clathration media in the aforesaid patent. It is therefore a highly advantageous feature of this invention that anhydrous alcoholic solutions of metal thiocyanates may be prepared which, upon the addition of nitrogen base, will form a physical system which may be used directly in the clathration process of said patent.

It is accordingly the principal object of this invention to provide simple and inexpensive methods for preparing the pure, anhydrous metal thiocyanates of manganese, iron, nickel, or cobalt. Another object is to provide means for preparing Werner complexes in anhydrous form while still maintaining precise control over the stoichiometric ratio of nitrogen base remaining therein. Still another object is to provide simple and inexpensive methods for preparing pure, anhydrous Werner complexes of the type useful for selective clathration. A more specific object is to provide convenient methods for preparing Werner complexes directly in the same solvent media which are useful in the selective clathration process itself. Other objects will be apparent from the more detailed description which follows.

The solvents usable herein include in general the saturated aliphatic mono-alcohols containing from 1 to 4 carbon atoms, and which may optionally contain an ether linkage. The preferred solvents are methyl Cellosolve (methoxy ethanol) and ethyl Cellosolve (ethoxy ethanol). Other solvents which may be employed include methanol, ethanol, propanol, isopropanol, butanol and the like. Mixtures of these solvents with each other are also contemplated. Also, other modifiers are also contemplated such as hydrocarbons (e.g. pentane, heptane, etc.), ethers, e.g. diethyl ether, and ketones, such as acetone, methyl ethyl ketone and the like.

Of the divalent metal salts to be used as reagent, the sulfates are greatly preferred. The sulfate salts of ammonium or alkali metal formed by metathesis as indicated by Equation 1, are almost completely insoluble in the specified solvents, and may hence be quantitatively separated from the divalent metal thiocyanate solution. The chloride salts may also be used, but to somewhat less advantage in that the alkali metal- and ammonium chlorides are slightly more soluble than the sulfates. It has been found, somewhat unexpectedly, that the foregoing sulfate and chloride salts may be employed either in anhydrous form, or in their usual hydrate forms. Water is apparently not necessary to obtain adequate reaction rates in the prescribed solvents. Where salt hydrates are employed as reagents, there will, of course, remain dissolved in the solution the original water of crystallization. In the case of all of the solvents except methanol and ethanol, this water may be removed very conveniently by simply azeotroping off a portion of the solvent. Where anhydrous salts are used, the azeotroping step is of course unnecessary.

Ammonium thiocyanate is the preferred source of thiocyanate ion, mainly from the standpoint of cost. However, where it is desired to start with anhydrous materials, the alkali metal thiocyanates, e.g. sodium, potassium or lithium thiocyanates, are preferred in that they are more stable thermally, and may hence be more readily dehydrated.

The initial metathetical reaction may be carried out at any desired temperature, but is accelerated by the use of high temperatures, e.g. above about 50° C. and up to about 200° C., especially when anhydrous salts are used. As indicated by the equations, substantially stoichiometric quantities of the two salts are employed, i.e. about 2 moles of the thiocyanate salt to one mole of the divalent metal salt. It may be desirable in some cases, however, to use a slight excess of one or the other.

The quantity of solvent to be used in the process is determined mainly by the solubility of the divalent metal thiocyanate therein. It is unnecessary to use such large amounts as to dissolve either of the reagent salts completely; it is only necessary to provide sufficient solvent to retain in solution all of the divalent metal thiocyanate produced, while precipitating out essentially all of the monovalent product salt, at the desired reaction temperature. The divalent metal thiocyanates are in general very soluble in the solvents of this invention. For example, nickel thiocyanate is soluble to the extent of at least about 20% by weight in methyl Cellosolve at room temperatures, and the thiocyanates of manganese, iron and cobalt are of commensurate solubility. The respective solubilities in the lower alkanols are generally somewhat lower than in the glycol mono-ether solvents. In general the amount of solvent to be used may range between about 1 and 20 parts by weight, per part of divalent metal thiocyanate to be produced. Amounts above or below these limits may sometimes be used, but in general, more than 20 parts by weight is an unnecessary expense, and amounts below 1 part may in some cases result in incomplete precipitation of the monovalent product salt.

The following flow diagram provides an overall picture of the process:

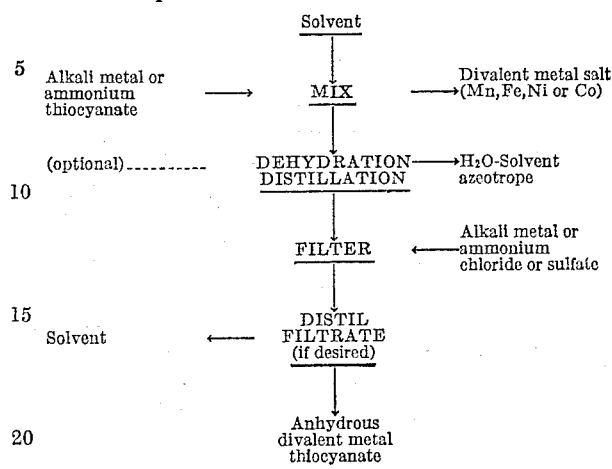

In most cases it is preferable to perform the dehydration-distillation step prior to the filtration step, as illustrated, in order to provide maximum completeness of precipitation of the monovalent product salt. However, these two steps can be reversed to slightly less advantage in most cases, or the dehydration-distillation step can be entirely omitted where substantially anhydrous reagent salts are used. It is also contemplated that additional dry solvent may be added before or after the dehydration-distillation step to replace the solvent removed as water azeotrope.

The following examples are cited to illustrate the operative details, but are not to be construed as limiting in scope.

EXAMPLE 1

(A) *Preparation of nickel thiocyanate*

To a 500 ml. 3-necked flask equipped with a stirrer and attached to a short distilling column was added 250 ml. of methyl-cellosolve, 53.0 g. (0.202 mole) of $NiSO_4 \cdot 6H_2O$ and 30.9 g. (0.406 mole) of ammonium thiocyanate. The mixture was stirred and refluxed for 45 minutes, then a total of 80 ml. of azeotropic distillate was taken overhead. This topping operation served to dry the refluxing mixture. The net residue was cooled to room temperature and the precipitate of $(NH_4)_2SO_4$ filtered off. The residue after drying was found to contain essentially the theoretical amount of $(NH_4)_2SO_4$. The dark green filtrate weighed 198.6 g. and remained homogeneous on prolonged standing at room temperature. It contained about 18% by weight of $Ni(SCN)_2$.

A portion of the filtrate was evaporated to dryness and constant weight in a 100–150° C. oven. The theoretical amount of anhydrous nickel thiocyanate was recovered as a yellowish powder. It contained no detectable solvent of crystallization.

(B) *Preparation of Werner complex*

Another portion of the filtrate was mixed with four mole-proportions of 4-methyl pyridine. A voluminous blue precipitate of the Werner complex,

$Ni(4\text{-methylpyridine})_4(SCN)_2$ was immediately formed, with evolution of heat. A slurry prepared in this manner was tested for the selective clathration of p-xylene from a meta-para-xylene mixture. It was found that the uptake of p-xylene was considerably higher than could be obtained using a Cellosolve slurry of the same Werner complex prepared by precipitation from an aqueous solution followed by washing and air-drying.

EXAMPLE 2

Part A of Example 1 is repeated using 0.2 mole of $CoCl_2 \cdot 6H_2O$ in place of the nickel sulfate. In this case NH₄Cl is recovered as the insoluble monovalent product salt in about 99% of theory. Addition of four mole-proportions of 4-ethylpyridine to the filtrate results in immediate precipitation of the Werner complex, $$Co(4\text{-ethylpyridine})_4(SCN)_2$$

as a heavy pink solid.

EXAMPLE 3

To a 2-liter 3-necked flask equipped with a stirrer and attached to a short distillation column was added 154.8 g. (1.0 mole) of anhydrous NiSO₄ (prepared by heating NiSO₄·6H₂O at 650° F. for 15 hours), 162.2 g. (2.0 moles) of NaSCN (prepared by drying commercial NaSCN at 150° C. for 2 hours) and 1076 g. of methylcellosolve (freshly distilled and dried over K₂CO₃).

The mixture was heated to reflux and stirred for 2 hours. It was observed that solution of the NiSO₄ became significant at about 80° C., and by the time the temperature reached 120° C. almost all of the NiSO₄ had dissolved. After refluxing for 2 hours the pot temperature was 126° C. and the overhead 117° C. A total of 26 ml. of distillate was collected which raised the overhead temperature to 124° C., but did not change the pot temperature, indicating that little if any water was present in the pot during the reaction.

The mixture was cooled to 25° C. and filtered. The filtrate weighed 1133 g. The solid on the filter was oven dried at 120° C. overnight, and was found to contain substantially the theoretical amount of anhydrous Na₂SO₄.

The filtrate gives anhydrous nickel thiocyanate upon evaporation of the solvent as described in Example 1. This example demonstrates that water is not necessary to promote the reaction of the reagent salts in Cellosolve solution.

EXAMPLE 4

The procedure of Example 1 is repeated in a 1-liter flask using 600 ml. of n-propyl alcohol in place of the methyl Cellosolve. Water is removed from the initial reaction mixture by taking overhead about 100 ml. of distillate condensing at below 92° C. The results are substantially indistinguishable from those of Example 1, except for the lesser solubility of nickel thiocyanate in the n-propanol solvent.

Those skilled in the art will readily understand that other solvents and reagent salts within the purview of this invention can be substituted in the above examples to obtain equivalent results. The true scope of the invention is intended to be defined by the following claims.

I claim:

1. A method for preparing a thiocyanate of a divalent metal selected from the group consisting of iron, manganese, cobalt and nickel, which comprises reacting a reagent salt of said divalent metal with a monovalent cation thiocyanate salt, at a molar ratio of the former to the latter of essentially 1:2, in an alcoholic solvent medium, said reagent salt being selected from the class consisting of sulfates and chlorides, said monovalent cation being selected from the class consisting of alkali metal and ammonium, and said solvent being a saturated aliphatic alcohol containing 1 to 4 carbon atoms, thereby forming a solution of divalent metal thiocyanate and precipitating an insoluble salt of said monovalent cation from the class consisting of sulfates and chlorides, and separating said last-named salt from the solution.

2. A method as defined in claim 1 wherein said divalent metal is nickel.

3. A method as defined in claim 1 wherein said reagent salt is nickel sulfate.

4. A method as defined in claim 1 wherein said solvent is methoxy ethanol.

5. A method for preparing a thiocyanate of a divalent metal selected from the group consisting of iron, manganese, cobalt and nickel, which comprises reacting an anhydrous reagent salt of said divalent metal with an anhydrous monovalent cation thiocyanate salt, at a molar ratio of the former to the latter of essentially 1:2, in an anhydrous alcoholic solvent medium, said reagent salt being selected from the class consisting of sulfates and chlorides, said monovalent cation being selected from the class consisting of alkali metal and ammonium, and said solvent being a saturated aliphatic alcohol containing 1 to 4 carbon atoms, thereby forming a solution of divalent metal thiocyanate and precipitating an insoluble salt of said monovalent cation from the class consisting of sulfates and chlorides, and separating said last-named salt from the solution.

6. A method as defined in claim 5 wherein said divalent metal is nickel.

7. A method as defined in claim 5 wherein said reagent salt is nickel sulfate.

8. A method as defined in claim 5 wherein said solvent is methoxy ethanol.

9. A method for preparing a thiocyanate of a divalent metal selected from the group consisting of iron, manganese, cobalt and nickel, which comprises reacting a reagent salt of said divalent metal with a monovalent cation thiocyanate salt, at a molar ratio of the former to the latter of essentially 1:2, in an alcoholic medium containing substantial amounts of water, said reagent salt being selected from the class consisting of sulfates and chlorides, said monovalent cation being selected from the class consisting of alkali metal and ammonium, and said solvent being a saturated aliphatic alcohol containing 3 to 4 carbon atoms, subjecting the resulting mixture to distillation until substantially all of said water is distilled overhead as an azeotrope with said alcohol, thereby forming an anhydrous solution of divalent metal thiocyanate and precipitating an insoluble salt of said monovalent cation from the class consisting of sulfates and chlorides, and separating said last-named salt from the solution.

10. A method as defined in claim 9 wherein said divalent metal is nickel.

11. A method as defined in claim 9 wherein said reagent salt is a hydrate of nickel sulfate.

12. A method as defined in claim 9 wherein said solvent is methoxy ethanol.

References Cited in the file of this patent

FOREIGN PATENTS 354,604     Great Britain _____ Aug. 13, 1931

OTHER REFERENCES

Jacobson; "Encyclopedia of Chemical Reactions," vol. III (1949), pages 29 and 73, vol. IV (1951), pages 42, 47 and 487, and vol. V (1953), pages 21 and 39.

"The Chemistry of Cyanogen Compounds," by H. E. Williams, 1915 ed., pages 192–194, 198, 199 and 207, J. & A. Churchill, London.